(12) United States Patent
Fang et al.

(10) Patent No.: US 7,869,384 B2
(45) Date of Patent: Jan. 11, 2011

(54) NETWORK ADDRESS ASSIGNMENT METHOD AND ROUTING METHOD FOR A LONG THIN ZIGBEE NETWORK

(75) Inventors: Hua-Wei Fang, Kaohsiung (TW); Yung-Chih Liu, Taipei (TW)

(73) Assignee: Institute For Information Industry, Taipei (TW)

( * ) Notice: Subject to any disclaimer, the term of this patent is extended or adjusted under 35 U.S.C. 154(b) by 205 days.

(21) Appl. No.: 11/965,741

(22) Filed: Dec. 28, 2007

(65) Prior Publication Data
US 2009/0141726 A1 Jun. 4, 2009

(30) Foreign Application Priority Data
Dec. 3, 2007 (TW) ............... 96145912 A (51) Int. Cl.
*H04L 12/56* (2006.01)
(52) U.S. Cl. .................. 370/256; 370/408
(58) Field of Classification Search ........... None
See application file for complete search history.

(56) References Cited

U.S. PATENT DOCUMENTS

| 6,788,650 B2* | 9/2004 | Chen et al. ............. 370/254 |
|---|---|---|
| 2004/0018839 A1* | 1/2004 | Andric et al. ............. 455/433 |
| 2005/0180447 A1 | 8/2005 | Lim et al. |
| 2005/0281207 A1* | 12/2005 | Lee et al. ............. 370/256 |
| 2006/0029002 A1 | 2/2006 | Park et al. |
| 2007/0036090 A1 | 2/2007 | Bhatti |
| 2007/0060143 A1 | 3/2007 | Bhatti |
| 2007/0091838 A1* | 4/2007 | Kobayashi et al. ............. 370/328 |
| 2007/0195808 A1* | 8/2007 | Ehrlich et al. ............. 370/408 |
| 2007/0268838 A1* | 11/2007 | Moon ............. 370/254 |
| 2008/0170513 A1* | 7/2008 | Niranjan et al. ............. 370/256 |
| 2008/0209070 A1* | 8/2008 | Horn ............. 709/238 |

* cited by examiner

*Primary Examiner*—Min Jung
(74) *Attorney, Agent, or Firm*—Jianq Chyun IP Office (57) ABSTRACT

A network address assignment method and a routing method for a long thin ZigBee network are provided. The routing method includes the following steps. A network address is assigned to each node of the ZigBee network, wherein each network address includes a cluster ID and a node ID. The cluster ID is used for identifying a plurality of clusters of the ZigBee network. The Node ID is used for identifying a plurality of nodes of each cluster. When a packet is transmitted, check whether the current node holding the packet and the destination node are in the same cluster. If they are in the same cluster, the packet is routed within the cluster according to the node ID of the destination node and a predetermined algorithm. If they are not in the same cluster, the packet is routed among the clusters according to the cluster ID of the destination node.

19 Claims, 7 Drawing Sheets

NETWORK ADDRESS ASSIGNMENT METHOD AND ROUTING METHOD FOR A LONG THIN ZIGBEE NETWORK

CROSS-REFERENCE TO RELATED APPLICATION

This application claims the priority benefit of Taiwan application serial no. 96145912, filed on Dec. 3, 2007. The entirety of the above-mentioned patent application is hereby incorporated by reference herein and made a part of this specification.

BACKGROUND OF THE INVENTION

1. Field of the Invention

The present invention relates to a long thin ZigBee network. More particularly, the present invention relates to a network address assignment method and a routing method for a long thin ZigBee network.

2. Description of Related Art

Within a rapid developed wireless sensor network technique, a ZigBee network protocol therein is an essential and a widespread technique. Routing methods defined by the ZigBee network protocol mainly includes a table routing and a tree routing.

Figure 1:
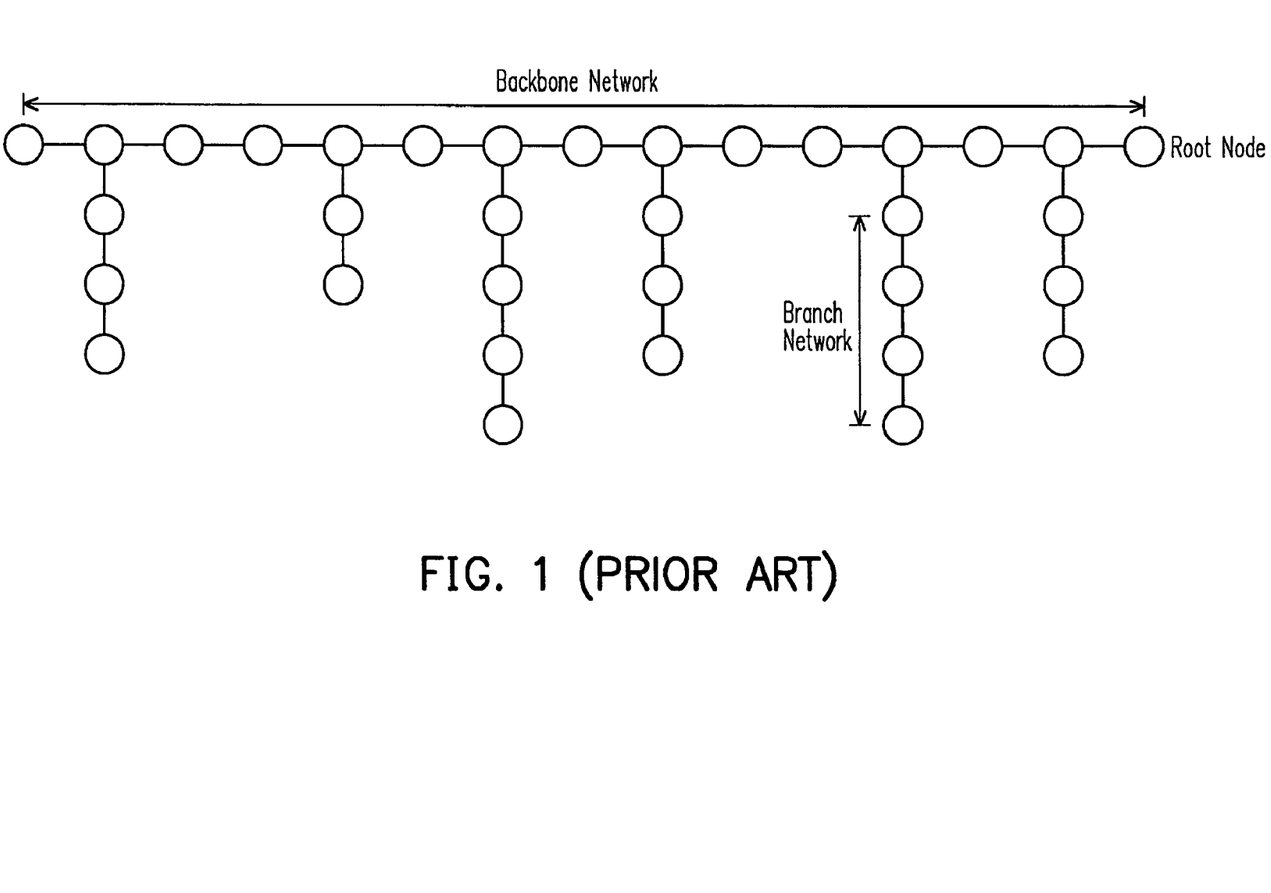
FIG. 1 is a schematic diagram of a conventional long thin ZigBee network.

The table routing is to determine a next node to be transmitted according to table look-up. The tree touting is to rout according to address assignment. A network applying the tree routing generally has a predetermined network topology, by which position of each node within the network is determined by an address, and therefore packet transmitting direction may be determined according to the addresses of the adjacent nodes. However, the two routing methods both have shortcomings thereof and are not suitable for a long thin network. FIG. 1 is a schematic diagram of a long thin network, wherein each circle represents a node. Main structure of the long thin network is composed of a long backbone network with relatively short branch networks.

As to the table routing method, a routing table is generally stored within a limited space of each node. For example, when a node A is about to transmit a packet to a node B, whether or not routing information for reaching the node B is stored within the node A is first judged. If there is, the packet is transmitted according to the routing information. If there is not, the node A may broadcast to the next nodes for inquiring a packet transmission routing to the node B, and after the routing information is obtained, the packet is transmitted to the node B. The disadvantage of this method is that the cost is relatively high. During routing, the node A probably keeps broadcasting to the adjacent nodes for obtained the routing information, and the required broadcasting time is relatively long, which may cause a network jam and a waste of transmission bandwidth.

As to the tree routing method, the routing direction is determined according to the addresses of the adjacent nodes. The ZigBee network devices support two address types. One is an institute of electrical and electronics engineers (IEEE) address with 64 bits, the other one is a network address with 16 bits. The IEEE address is exclusive within the entire ZigBee network devices, while the network address with 16 bits may be designed by users for determining the routing information. However, since the network address has only 16 bits, so that only $2^{16}$ addresses may be assigned.

Figure 2:
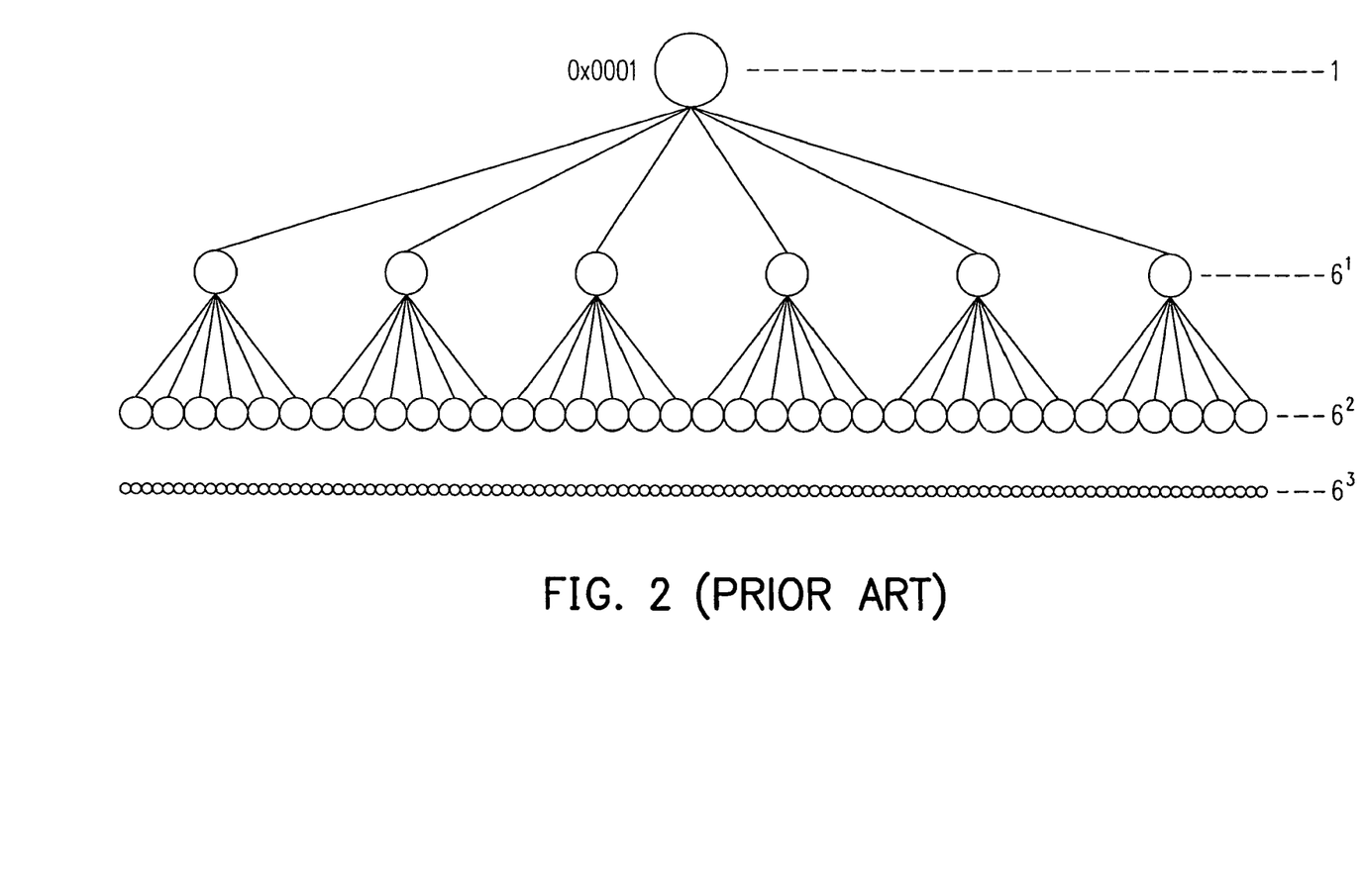
FIG. 2 is a schematic diagram of a conventional tree ZigBee network.

Each node within the network may only have a unique network address, and the network topology applying the tree routing method must be a balanced tree. Taking a network topology with a maximum depth (MAX_DEPTH) thereof being 5 and a maximum number of children (MAX_CHILDREN) thereof being 6 as an example, the maximum depth of the network address with 16 bits is 5, as shown in FIG. 2. Only a part of the nodes are illustrated in FIG. 2 due to a large quantity thereof. As to the balanced tree with the maximum number of children thereof being 2, the maximum depth of the network address with 16 bits is 15 at most, which is not suitable for the long thin network with general maximum depth thereof being greater than 15.

As described above, the two routing methods, i.e. the table routing method and the tree routing method defined by the ZigBee network protocol are not suitable of the long thin network.

SUMMARY OF THE INVENTION

The present invention is directed to a network address assignment method for a long thin ZigBee network, by which cost of packet transmission is reduced.

The present invention is directed to a routing method for a long thin ZigBee network, by which a network routing performance is improved.

In the present invention, the long thin ZigBee network includes a plurality of clusters, and each cluster includes a cluster header and a plurality of cluster members.

The present invention provides a network address assignment method for a long thin ZigBee network, by which a network address is assigned to each node of the long thin ZigBee network, wherein each network address includes a cluster ID and a node ID. The cluster ID is used for identifying a plurality of clusters of the long thin ZigBee network and routing a packet among the clusters. The Node ID is used for identifying a plurality of nodes of each cluster and routing the packet within each cluster.

In an embodiment of the present invention, the cluster IDs of the clusters are arranged increasingly or decreasingly started from a coordinator of the long thin ZigBee network. The node ID of each cluster header is set to zero, and the node IDs of the cluster members are assigned according to a conventional ZigBee network address assignment algorithm.

In an embodiment of the present invention, each of the clusters is a balanced tree, and each balanced tree has the same maximum depth and the same maximum number of children. Alternatively, each balanced tree may also have different maximum depth and maximum number of children.

The present invention provides a routing method for a long thin ZigBee network, and the method is as follows. First, a network address of each node is assigned according to the aforementioned network address assignment method. When a packet is transmitted, whether or not the cluster ID of the current node holding the packet is the same as the cluster ID of the destination node of the packet is judged. If the two cluster IDs are the same, the packet is routed within the cluster according to the node ID of the destination node and a predetermined algorithm. If the two cluster IDs are not the same, the packet is routed among the clusters according to the cluster ID of the destination node.

In an embodiment of the present invention, the predetermined algorithm is a tree routing algorithm or a table routing algorithm.

In an embodiment of the present invention, if the cluster ID of the current node holding the packet is not the same as the cluster ID of the destination node and the current node is a cluster member, the packet is then transmitted to the parent node of the current node. If the cluster ID of the current node holding the packet is not the same as the cluster ID of the destination node and the current node is a cluster header, the packet is then transmitted to a parent cluster header or a child cluster header of the current node according to a comparison result between the cluster ID of the current node and the cluster ID of the destination node.

In an embodiment of the present invention, If the cluster ID of the current node holding the packet is not the same as the cluster ID of the destination node and the current node is the cluster header, rules of transmitting the packet among the cluster headers are as follows. If the cluster ID of the destination node is within a range defined by the cluster ID of the coordinator and the cluster ID of the current node, the packet is then transmitted to the parent cluster header of the current node. Conversely, if the cluster ID of the destination node is beyond the range defined by the cluster ID of the coordinator and the cluster ID of the current node, the packet is then transmitted to the child cluster header of the current node.

In an embodiment of the present invention, when the packet is transmitted among the cluster headers, if a certain parent cluster header cannot receive the packet and the cluster ID of the parent cluster header is not the same as the cluster ID of the destination node, the packet is then transmitted to a parent cluster header of the parent cluster header. On the other hand, if a certain child cluster header cannot receive the packet and the cluster ID of the child cluster header is not the same as the cluster ID of the destination node, the packet is then transmitted to a child cluster header of the child cluster header.

The network address assignment method and routing method of the present invention are designed for long thin ZigBee networks. Therefore they are especially suitable for long thin ZigBee networks. Accordingly the cost of packet transmission is reduced and the network routing performance is improved.

In order to make the aforementioned and other objects, features and advantages of the present invention comprehensible, a preferred embodiment accompanied with figures is described in detail below.

DESCRIPTION OF EMBODIMENTS

Figure 3:
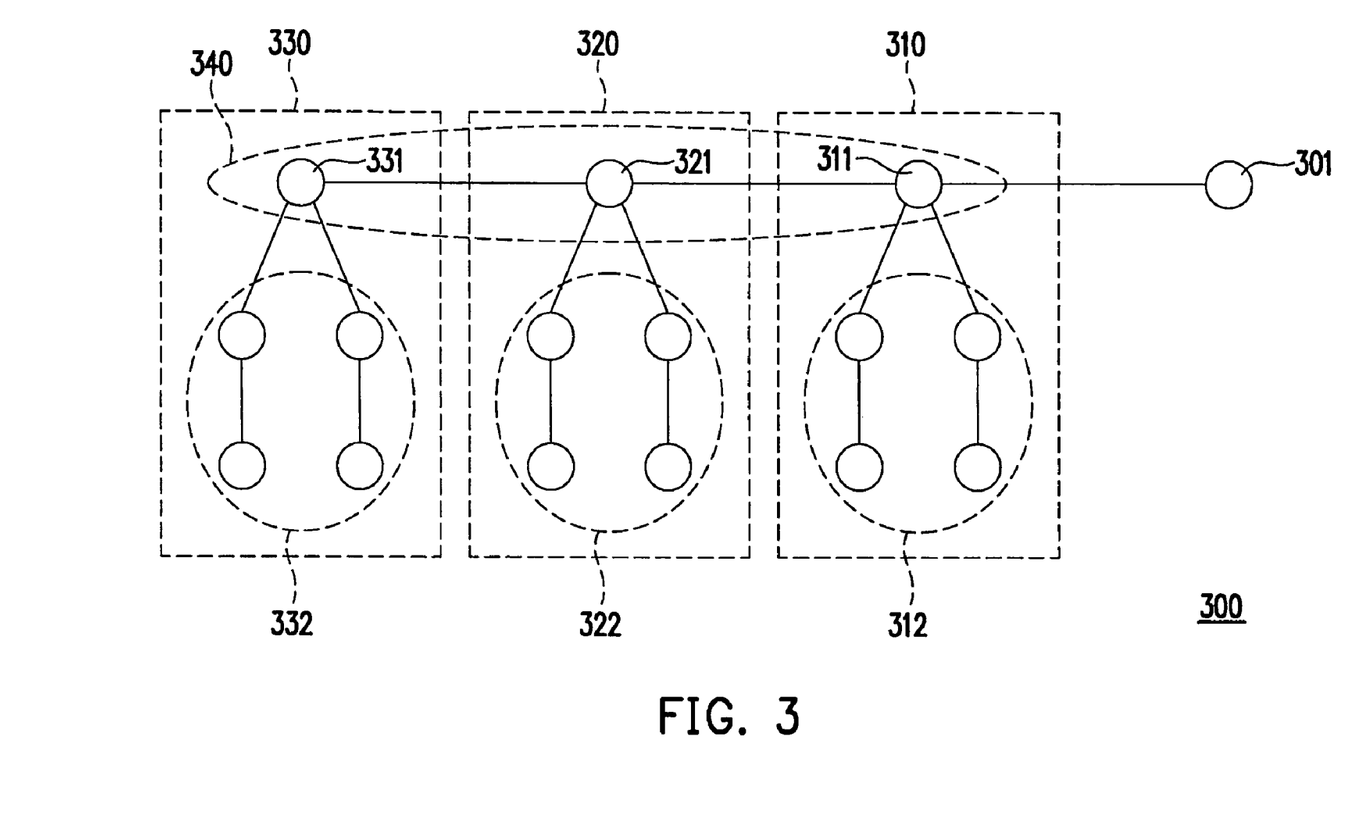
FIG. 3 is a schematic diagram of a long thin ZigBee network according to an embodiment of the present invention.
Figure 4:
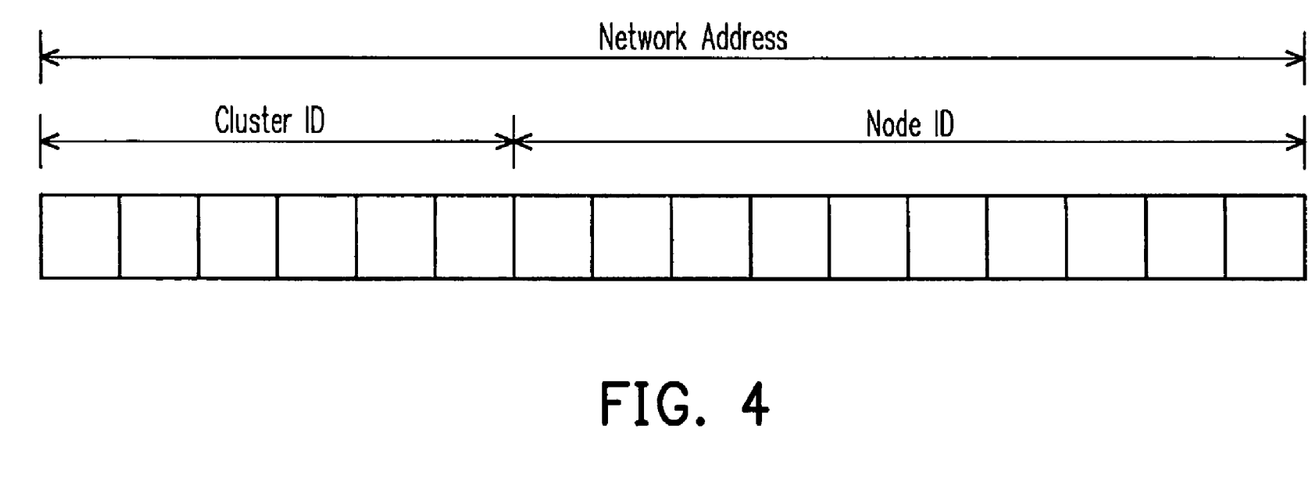
FIG. 4 is a schematic diagram of a network address according to an embodiment of the present invention.

FIG. 3 is a schematic diagram of a long thin ZigBee network 300 according to an embodiment of the present invention. The long thin ZigBee network of the present embodiment includes a coordinator and a plurality of clusters. For example, the long thin ZigBee network 300 of FIG. 3 includes a coordinator 301 and three clusters 310, 320 and 330. Each cluster includes a cluster header and a plurality of cluster members, for example, the cluster 310 includes a cluster header 311 and four cluster members 312; the cluster 320 includes a cluster header 321 and four cluster members 322; and the cluster 330 includes a cluster header 331 and four cluster members 332. The number of cluster members of each cluster may be the same or different. The cluster headers form a backbone network of the long thin ZigBee network, for example, the cluster headers 311, 321 and 331 form the backbone network 340 of the ZigBee network 300.

packet routing of the present embodiment is based on the network addresses with 16 bits. The network address has pre-assigned to each node within the network since the ZigBee network was designed. As shown in FIG. 4, each network address includes a cluster ID and a node ID. The number of bits occupied by the cluster ID and the node ID respectively are determined according to the actual requirement of the application. The cluster ID is used for identifying the clusters of the ZigBee network and routing the packet among the clusters. The Node ID is used for identifying the nodes of each cluster and routing the packet within each cluster.

The cluster ID of each node is the same as that of the cluster header of the node, namely, all the nodes within the same cluster have the same cluster ID. The nodes of different clusters have different cluster IDs. The coordinator has a unique cluster ID which is different from that of all the clusters. The nodes within the same cluster have different node IDs.

To easily judge a routing direction of the packet, the cluster IDs of all the cluster headers have to be a strictly increasing sequence or a strictly decreasing sequence. In case of the strictly increasing sequence, the coordinator must have the minimum cluster ID of the whole network, for example, the network address of the coordinator may be 0x0000. The more far away the cluster header located from the coordinator, the larger the cluster ID being assigned to the cluster header. Conversely, in case of the strictly decreasing sequence, the coordinator must have the maximum cluster ID of the whole network. The more far away the cluster header located from the coordinator, the smaller the cluster ID being assigned to the cluster header. If a more regular sequence is required, the cluster IDs of the cluster headers may be set as an arithmetic sequence.

As to the assignment of the node IDs, the node ID of each cluster header may be set to zero, while the node IDs of the cluster members may be assigned according to a conventional ZigBee network address assignment algorithm.

Figure 5:
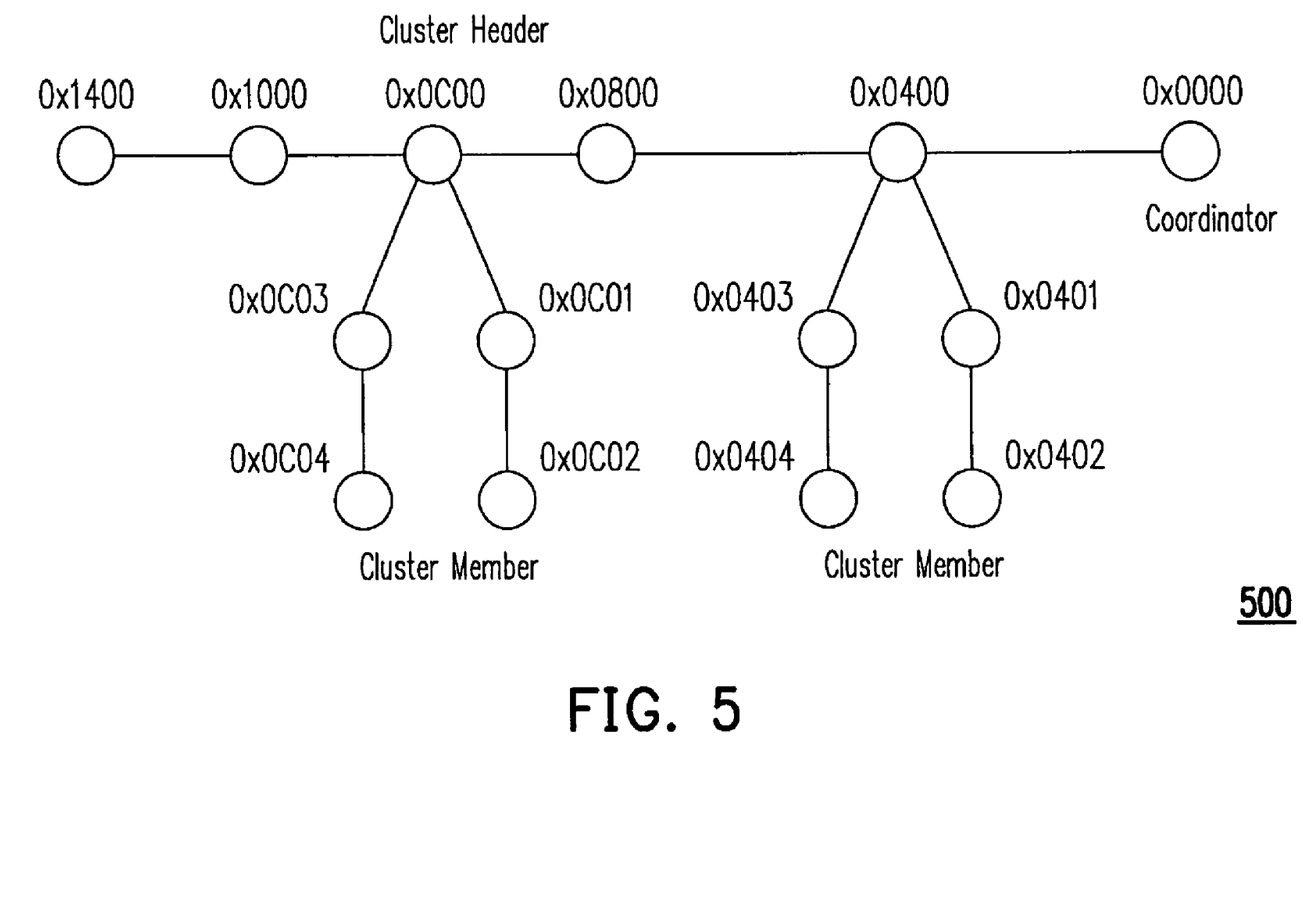
FIG. 5 is a schematic diagram of a long thin ZigBee network according to an embodiment of the present invention.
Figure 6:
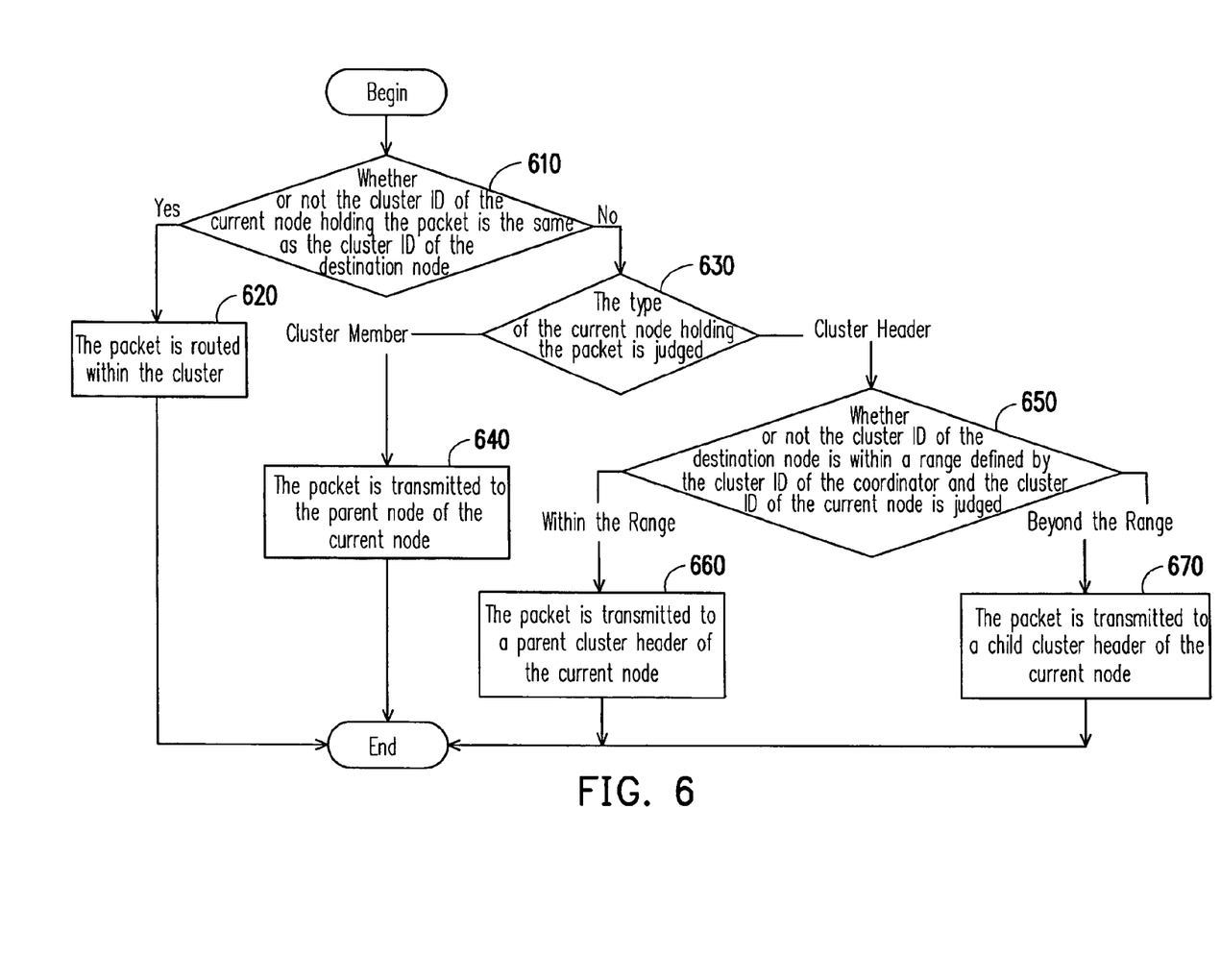
FIG. 6 is a flowchart illustrating a packet routing method of a long thin ZigBee network according to an embodiment of the present invention.

The packet routing method of the present embodiment is described as follows. Description of the packet routing method will be set forth with reference of FIG. 5 and FIG. 6. FIG. 6 is a flowchart illustrating a packet routing method of a long thin ZigBee network according to an embodiment of the present invention. FIG. 5 is an example of a ZigBee network used for explaining the flowchart of FIG. 6. All nodes and the network addresses of the nodes are illustrated in a long thin ZigBee network 500 of FIG. 5, wherein the network addresses with 6 bits of cluster ID and 10 bits of node ID are the same as that shown in FIG. 4. The flowchart of FIG. 6 starts from step 610.

First, when a certain packet is about to be transmitted to a certain destination node, in step 610, whether or not the cluster ID of a current node holding the packet is the same as the cluster ID of the destination node to be transmitted is judged. If the two cluster IDs are the same, it represents the current node holding the packet and the destination node are within the same cluster, for example, a node 0x0402 and a node 0x0404 in FIG. 5. Then, in step 620, the packet is routed within the cluster according to the node ID of the destination node and a predetermined algorithm.

The predetermined algorithm is used for packet routing within a single cluster, which may be a tree routing algorithm or a table routing algorithm. In case of the tree routing algorithm, to simplify the calculation, each of the clusters may be designed as a balanced tree topology, and each balanced tree may be set to have the same maximum depth and maximum number of children. Though this is not a necessary limiting condition, in another embodiment of the present invention, each balanced tree may have different maximum depth and maximum number of children.

Back to the step 610, if the cluster ID of the current node holding the packet is not the same as the cluster ID of the destination node, it represents the current node holding the packet and the destination node are not in the same cluster, for example, the current node is 0x0402, and the destination node is 0x0C03. Now, the packet has to be routed among the clusters according to the cluster ID of the destination node. Then, in step 630, type of the current node holding the packet is judged. If the current node is the general cluster member (not the cluster header), in step 640, the packet is then transmitted to a parent node of the current node. For example, the node 0x0402 may transmit the packet to a node 0x0401, and the node 0x0401 may transmit the packet to a cluster header 0x0400.

Back to the step 630, if the current node holding the packet is the cluster heater, in step 650, whether or not the cluster ID of the destination node is within a range defined by the cluster ID of the coordinator and the cluster ID of the current node is then judged. If yes, it represents the destination node is located between the coordinator and the current node, and in step 660, the packet is then transmitted to a parent cluster header of the current node, i.e. a next cluster header in a direction closed to the coordinator. Conversely, if the cluster ID of the destination node is beyond the defined range, in step 670, the packet is then transmitted to a child cluster header of the current node, i.e. a previous cluster header in a direction apart form the coordinator. For example, the parent cluster header of a cluster header 0x0800 is 0x0400, and the child cluster header thereof is 0x0C00.

In the aforementioned example where the packet is transmitted from the node 0x0402 to the node 0x0C03, the transmitted packet sequentially passes through the node 0x0401, 0x0400 and 0x0800, and then reaches the cluster header 0x0C00. Then, the steps 610 and 620 are sequentially performed on the cluster header 0x0C00, and the packet is finally transmitted to the node 0x0C03 based on the packet routing according to the predetermined algorithm of the step 620.

Figure 7:
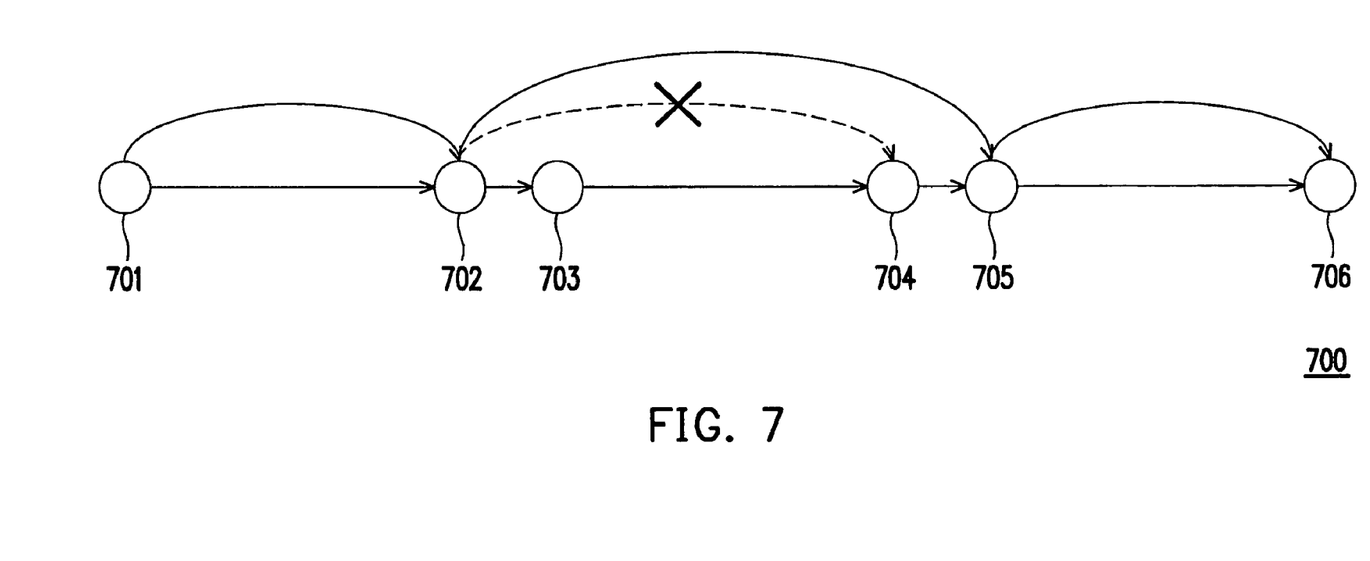
FIG. 7 is a schematic diagram of a long thin ZigBee network according to an embodiment of the present invention.

Wireless sensor network may be a plied in a natural environment with a large area, and the nodes therein may be damaged. The damaged nodes cannot transmit the packet. To solve this problem, a fault tolerance mechanism of the backbone network is provided in the present invention. FIG. 7 is a schematic diagram illustrating a long thin ZigBee network 700 according to an embodiment of the present invention. Referring to FIG. 7, for the sake of simplicity, only a part of the backbone network of the ZigBee network 700 is illustrated in FIG. 7, i.e. only the cluster headers 701~706 are illustrated in FIG. 7.

The fault tolerance mechanism of the present embodiment is that when the packet is transmitted among the cluster headers, if a certain parent cluster header cannot receive the packet and the cluster ID of the parent cluster header is not the same as the cluster ID of the destination node, the packet is then transmitted to a parent cluster header of the parent cluster header. On the other hand, if a certain child cluster header cannot receive the packet and the cluster ID of the child cluster header is not the same as the cluster ID of the destination node, the packet is then transmitted to a child cluster header of the child cluster header. For example, as shown in FIG. 7, the packet is originally transmitted from the cluster header 702 to the cluster header 704. If the cluster header 704 cannot receive the packet, the packet is then directly transmitted from the cluster header 702 to the cluster header 705. To achieve the fault tolerance effect, wireless transmission range of each cluster header has to cover at least two parent cluster headers in a direction close to the coordinator, and has to cover at least two child cluster headers in the direction apart from the coordinator.

In summary, the network address assignment method and routing method of the present invention are designed for long thin ZigBee networks. Therefore they are suitable for long thin ZigBee networks and are especially suitable for long thin ZigBee networks with the maximum depth being greater than 15. The cost of packet transmission is reduced and the network routing performance is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A network address assignment method for a long thin ZigBee network, characterized by:

each node of the long thin ZigBee network accepting a network address, wherein the network address is composed of a cluster ID and a node ID, the cluster ID and the node ID are numbers, the cluster ID is used for identifying a plurality of clusters of the long thin ZigBee network and for routing a packet among the clusters, the node ID is used for identifying a plurality of nodes of each said cluster and for routing the packet within each said cluster, the cluster IDs of all cluster headers of the long thin ZigBee network form a strictly increasing sequence or a strictly decreasing sequence, if the cluster IDs of the cluster headers form the strictly increasing sequence, the cluster IDs increase as distances between a coordinator of the long thin ZigBee network and the cluster headers corresponding to the cluster IDs increase, and if the cluster IDs of the cluster headers form the strictly decreasing sequence, the cluster IDs decrease as the distances between the coordinator and the cluster headers corresponding to the cluster IDs increase.

2. The network address assignment method for a long thin ZigBee network as claimed in claim 1, wherein if the cluster IDs of the cluster headers form the strictly increasing sequence, the cluster ID of the coordinator is smaller than each said cluster ID within the strictly increasing sequence, and if the cluster IDs of the cluster headers form the strictly decreasing sequence, the cluster ID of the coordinator is larger than each said cluster ID within the strictly decreasing sequence.

3. The network address assignment method for a long thin ZigBee network as claimed in claim 1, wherein the cluster IDs of the cluster headers form an arithmetic sequence.

4. The network address assignment method for a long thin ZigBee network as claimed in claim 1, wherein the node ID of each said cluster header is zero.

5. The network address assignment method for a long thin ZigBee network as claimed in claim 1, wherein the cluster ID of each said node is the same as that of the cluster header of the node.

6. The network address assignment method for a long thin ZigBee network as claimed in claim 1, wherein each of the clusters is a balanced tree.

7. The network address assignment method for a long thin ZigBee network as claimed in claim 6, wherein each of the balanced trees has the same maximum depth and maximum number of children.

8. A routing method for a long thin ZigBee network, comprising:
   (a) assigning a network address to each node of the long thin ZigBee network, wherein the network address is composed of a cluster ID and a node ID, the cluster ID is used for identifying a plurality of clusters of the long thin ZigBee network, and the node ID is used for identifying a plurality of nodes of each said cluster, the cluster ID and the node ID are numbers, the cluster IDs of all cluster headers of the long thin ZigBee network form a strictly increasing sequence or a strictly decreasing sequence, if the cluster IDs of the cluster headers form the strictly increasing sequence, the cluster IDs increase as distances between a coordinator of the long thin ZigBee network and the cluster headers corresponding to the cluster IDs increase, and if the cluster IDs of the cluster headers form the strictly decreasing sequence. the cluster IDs decrease as the distances between the coordinator and the cluster headers corresponding to the cluster IDs increase;
   (b) judging whether or not the cluster ID of a current node holding a packet is the same as the cluster ID of a destination node of the packet;
   (c) routing the packet within the cluster according to the node ID of the destination node and a predetermined algorithm if the cluster ID of the current node holding the packet is the same as the cluster ID of the destination node; and
   (d) routing the packet among the clusters according to the cluster ID of the destination node if the cluster ID of the current node holding the packet is not the same as the cluster ID of the destination node.

9. The routing method for a long thin ZigBee network as claimed in claim 8, wherein if the cluster IDs of the cluster headers form the strictly increasing sequence, the cluster ID of the coordinator is smaller than each said cluster ID within the strictly increasing sequence, and if the cluster IDs of the cluster headers form the strictly decreasing sequence, the cluster ID of the coordinator is larger than each said cluster ID within the strictly decreasing sequence.

10. The routing method for a long thin ZigBee network as claimed in claim 8, wherein the cluster IDs of the cluster headers form an arithmetic sequence.

11. The routing method for a long thin ZigBee network as claimed in claim 8, wherein the node ID of each said cluster header is zero.

12. The routing method for a long thin ZigBee network as claimed in claim 8, wherein the cluster ID of each said node is the same as that of the cluster header of the node.

13. The routing method for a long thin ZigBee network as claimed in claim 8, wherein each of the clusters is a balanced tree.

14. The routing method for a long thin ZigBee network as claimed in claim 13, wherein each of the balanced trees has the same maximum depth and maximum number of children.

15. The routing method for a long thin ZigBee network as claimed in claim 8, wherein the predetermined algorithm is a tree routing algorithm or a table routing algorithm.

16. The routing method for a long thin ZigBee network as claimed in claim 8, wherein the step (d) comprises:
    (d1) transmitting the packet to a parent node of the current node if the cluster ID of the current node is not the same as the cluster ID of the destination node and the current node is a cluster member; and
    (d2) transmitting the packet to a parent cluster header or a child cluster header of the current node according to a comparison result between the cluster ID of the current node and the cluster ID of the destination node if the cluster ID of the current node is not the same as the cluster ID of the destination node and the current node is a cluster header.

17. The routing method for a long thin ZigBee network as claimed in claim 16, wherein the step (d2) comprises:
    (d21) transmitting the packet to the parent cluster header of the current node if the cluster ID of the destination node is within a range defined by the cluster ID of the coordinator and the cluster ID of the current node; and
    (d22) transmitting the packet to the child cluster header of the current node if the cluster ID of the destination node is beyond the defined range between the cluster ID of the coordinator and the cluster ID of the current node.

18. The routing method for a long thin ZigBee network as claimed in claim 17, wherein the step (d21) comprises:
    transmitting the packet to a parent cluster header of the parent cluster header if the parent cluster header of the current node cannot receive the packet and the cluster ID of the parent cluster header of the current node is not the same as the cluster ID of the destination node;
    and the step (d22) comprises:
    transmitting the packet to a child cluster header of the child cluster header if the child cluster header of the current node cannot receive the packet and the cluster ID of the child cluster header of the current node is not the same as the cluster ID of the destination node.

19. A routing method for a long thin ZigBee network, comprising:
    (a) assigning a network address to each node of the long thin ZigBee network, wherein the network address includes a cluster ID and a node ID, the cluster ID is used for identifying a plurality of clusters of the long thin ZigBee network, and the node ID is used for identifying a plurality of nodes of each said cluster;
    (b) judging whether or not the cluster ID of a current node holding a packet is the same as the cluster ID of a destination node of the packet;
    (c) routing the packet within the cluster according to the node ID of the destination node and a predetermined algorithm if the cluster ID of the current node holding the packet is the same as the cluster ID of the destination node;
    (d) transmitting the packet to a parent node of the current node if the cluster ID of the current node is not the same as the cluster ID of the destination node and the current node is a cluster member; and
    (e) transmitting the packet to a parent cluster header or a child cluster header of the current node according to a comparison result between the cluster ID of the current node and the cluster ID of the destination node if the cluster ID of the current node is not the same as the cluster ID of the destination node and the current node is a cluster header.

* * * * *